US012460699B2

United States Patent
Averill et al.

(10) Patent No.: US 12,460,699 B2
(45) Date of Patent: Nov. 4, 2025

(54) CABLE TERMINATION INSPECTION COVER ASSEMBLY

(71) Applicant: WireCo WorldGroup Inc., Prairie Village, KS (US)

(72) Inventors: Andrew Averill, King of Prussia, PA (US); Nathan Joseph Engler, Perkasie, PA (US)

(73) Assignee: WIRECO WORLDGROUP INC., Prairie Village, KS (US)

( * ) Notice: Subject to any disclaimer, the term of this patent is extended or adjusted under 35 U.S.C. 154(b) by 300 days.

(21) Appl. No.: 18/323,329

(22) Filed: May 24, 2023

(65) Prior Publication Data

US 2023/0384128 A1 Nov. 30, 2023

Related U.S. Application Data

(60) Provisional application No. 63/346,706, filed on May 27, 2022.

(51) Int. Cl.
*F16G 11/02* (2006.01)
*D07B 9/00* (2006.01)
(Continued)

(52) U.S. Cl.
CPC .............. *F16G 11/025* (2013.01); *D07B 9/00* (2013.01); *F16G 11/00* (2013.01); *G01B 5/08* (2013.01);
(Continued)

(58) Field of Classification Search
CPC ......... F16G 11/025; F16G 11/00; D07B 9/00; D07B 2201/20; D07B 2205/2046; D07B 2205/205; G01B 5/08; G01D 11/26
See application file for complete search history.

(56) References Cited

U.S. PATENT DOCUMENTS 6,623,173 B1 * 9/2003 Grois ................ G02B 6/44715
385/76
8,564,440 B2 * 10/2013 Yokota .................. G06Q 50/04
340/568.1
(Continued)

FOREIGN PATENT DOCUMENTS

CN 216118129 U * 3/2022
JP 3237855 U * 6/2022
(Continued)

OTHER PUBLICATIONS

CN-216118129-U, English Translation (Year: 2022).*
(Continued)

*Primary Examiner* — Ryan D Walsh
(74) *Attorney, Agent, or Firm* — Husch Blackwell LLP (57) ABSTRACT

A cover assembly for a synthetic cable having a termination end secured on a jacketed end of the synthetic cable is provided. The cover assembly includes a shell and an inspection port. The shell is configured to extend around and at least partially enclose a socket portion of the termination end of the synthetic cable. The inspection port is defined into the shell for viewing access of at least part of the termination end of the synthetic cable. The inspection port is positioned along a length of the shell that aligns with the socket portion of the termination end so that the socket portion of the termination end and the jacketed end of the synthetic cable are visible through the inspection port. The jacketed end of the synthetic cable extends into the socket portion of the termination end.

16 Claims, 10 Drawing Sheets

(51) Int. Cl.
 *F16G 11/00* (2006.01)
 *G01B 5/08* (2006.01)
 *G01D 11/26* (2006.01)
(52) U.S. Cl.
 CPC .......... *G01D 11/26* (2013.01); *D07B 2201/20* (2013.01); *D07B 2205/2046* (2013.01); *D07B 2205/205* (2013.01)

(56) References Cited

U.S. PATENT DOCUMENTS

| | | | |
|---|---|---|---|
| 10,167,928 B2 | 1/2019 | Campbell | |
| 10,578,191 B2* | 3/2020 | Campbell | F16G 11/042 |
| 11,221,055 B2 | 1/2022 | Campbell | |
| 11,486,465 B2 | 11/2022 | Campbell | |
| 2008/0273844 A1* | 11/2008 | Kewitsch | G02B 6/447 385/101 |
| 2012/0021650 A1* | 1/2012 | Borgstrom | H01R 24/20 439/626 |
| 2014/0338168 A1 | 11/2014 | Campbell | |
| 2017/0356481 A1* | 12/2017 | Campbell | F16G 11/09 |
| 2019/0178343 A1 | 6/2019 | Campbell | |
| 2020/0207445 A1* | 7/2020 | Lin | B63B 21/20 |
| 2021/0033487 A1 | 2/2021 | Campbell | |
| 2022/0025958 A1 | 1/2022 | Campbell | |
| 2022/0282770 A1* | 9/2022 | Campbell | F16G 11/146 |
| 2023/0047902 A1 | 2/2023 | Campbell | |
| 2023/0258740 A1* | 8/2023 | Campbell | G01L 5/103 324/543 |

FOREIGN PATENT DOCUMENTS

| | | |
|---|---|---|
| WO | 2013173405 A1 | 11/2013 |
| WO | 2020142224 A1 | 7/2020 |
| WO | 2021021244 A1 | 2/2021 |

OTHER PUBLICATIONS

JP-3237855-U, English Translation (Year: 2022).*
Automation Magazine; "At SPS IPC Drives 2018, TE Connectivity shows how NFC chip integration in cable connectors can power Industry 4.0"; Published Nov. 29, 2018; see NPL p. 1 for internet address (Year: 2018).*

* cited by examiner

CABLE TERMINATION INSPECTION COVER ASSEMBLY

CROSS-REFERENCE TO RELATED APPLICATIONS

The present application claims priority to U.S. Provisional Patent Application No. 63/346,706 entitled "Cable Termination Inspection Cover Assembly," filed May 27, 2022. The entire disclosure, including the specification and drawings, of U.S. Provisional Patent Application No. 63/346,706 is incorporated herein by reference.

BACKGROUND OF THE INVENTION

Synthetic cable termination ends, such as boom pendants and other potted terminations require periodic inspection to assess the condition of the cable seating and determine whether it has undergone damage or has a significant risk of potential failure that requires replacement or maintenance of the cable. These types of cables are often used and/or attached to equipment in hard-to-reach locations that makes inspection time consuming and potentially dangerous. The inspection of steel cables and boom pendants are traditionally inspected using various non-destructive evaluation (NDE) technologies, such as radiography and ultrasonic testing, that allow for more efficient inspection of the cable end and seating. However, these techniques do not work for synthetic cables and synthetic boom pendants.

Currently-used methods for inspecting synthetic cable terminations and boom pendants require an inspector to get physical access to the termination end of the cable, remove the jacket cover, and then conduct the inspection to, among other things, measure and analyze the seating of the socket and/or the diameter change in the cable to see if the resin has begun to degrade or fail and/or if sub-ropes, fibers, and/or strands within the cable core have broken. This requires the use of tools and equipment to both remove the jacket cover and conduct the inspection and measurements. The inspector not only has to spend significant time to reach the cable termination end, as they are in hard-to-reach locations, but also has to spend significant time conducting the inspection. Further, if equipment batteries need to be replaced during the inspection, or a required tool to complete the inspection is not brought with the inspector, the inspector must spend significant time going to and from the cable termination end site. All of this is also potentially dangerous as the cable ends are located in remote areas.

Accordingly, a need exists for a cover assembly of a synthetic cable termination that allow for fast, simple, and efficient inspection of the seating of the cable without the use of significant tools and time.

BRIEF SUMMARY OF THE INVENTION

The present invention is directed generally to a cover assembly for a synthetic cable or rope termination end and a system for using the cover assembly. The cover assembly of the present invention can be configured to include a shell and an inspection port. According to one embodiment, the inspection port is positioned on the shell to provide access to view a jacketed portion of the synthetic cable or synthetic rope.

According to a first embodiment, the cover assembly for a synthetic cable having a termination end secured on a jacketed end of the synthetic cable can include a shell and an inspection port. The shell may be configured to extend around and at least partially enclose a socket portion of the termination end of the synthetic cable. The inspection port may be defined into the shell for viewing access of at least part of the termination end of the synthetic cable. The inspection port may be positioned along a length of the shell that aligns with the socket portion of the termination end so that the socket portion of the termination end and the jacketed end of the synthetic cable are visible through the inspection port. The jacketed end of the synthetic cable may extend into the socket portion of the termination end.

According to a second embodiment, the synthetic cable assembly may include a synthetic cable, a termination end, a shell, and an inspection port. The synthetic cable may include one or more cable sub-ropes forming a core and a jacket surrounding the core. The synthetic cable may include a cable end and a visible portion adjacent the cable end. The termination end may include a socket portion. The cable end of the synthetic cable may be secured within the socket portion. The jacket of the synthetic cable may extend into the socket portion of the termination end. The shell may be configured to extend around and at least partially enclose the socket portion of the synthetic cable. The inspection port may be defined into the shell for viewing access of at least a portion of the synthetic cable and at least a portion of the termination end. The inspection port may be positioned on the shell at the socket portion of the termination end and the visible portion of the synthetic cable.

According to a third embodiment, the system for inspecting a synthetic cable having a socket termination end and cover assembly positioned therearound may include a Near Field Communication (NFC) chip, an electronic user device, and a user interface. The NFC chip may be attached to the cover assembly. The electronic user device may be in connection with the NFC chip. The user interface may be in connection with the electronic user device. The user interface may be configured to access an interface hosting a data form specific to the socket termination end associated with the NFC chip of the cover assembly.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

Referring to the figures, the present invention is directed to a cover assembly 10 for use with a termination end 12 of a synthetic cable or rope 14, and particularly, for enabling inspection of the seating of termination end 12 and socket 13 thereof, as well as assessment of the current state and condition of cable 14, termination end 12, and socket 13. The present invention is also directed to a cover assembly system 100 for inspecting termination end 12 of a synthetic cable 14 through the use of a mobile or similar electronic device with wireless capabilities. In certain applications, cover assembly 10 can be configured for use on synthetic boom pendants, which may include a synthetic cable 14 having a potted termination end 12 affixed at the end of the synthetic cable 14. Cover assembly 10 can also be suitably used on main boom pendants on draglines, electric rope shovels, or other types of synthetic cable termination ends or potted terminations, including any applications where synthetic boom pendants are used, where inspection of termination end and socket seating for synthetic cables and ropes is important or desirable.

Synthetic cable 14 can be configured and constructed in any traditional or known manner typically used to construct synthetic cable tensile members. For example, synthetic cable 14 can include a cable core having one or more sub-ropes, fibers or cable strands, and a jacket or insulating or protecting member extruded around the core. In one embodiment, the entirety of cable 14 may be protected by one or more jacket layers that extend the entire length of cable 14, such that no fibers or strands of the core of cable 14 are visible or exposed. The sub-ropes, strands or fibers of the cable core and the surrounding jacket of cable 14 can be constructed of any suitable material or materials known in the art. The foregoing represents only exemplary configuration of a synthetic cable 14 and it is recognized that any alternative configurations and constructions for synthetic cable 14 may be used.

The end of synthetic cable 14 can be configured with a termination end 12 attached thereto. Termination end 12 can include a socket portion 13 that receives an end portion of cable 14 and enables the end of cable 14 to be anchored to equipment, other cables or other objects when in use. Socket 13 represents the affixing means where the free end of cable 14 is secured to termination end 12. The end of cable 14 is inserted into and received within socket 13 of termination end 12 and secured therein using a potting compound, resin or similar substance for anchoring and affixing the end of cable 14 within termination end 12.

Cover assembly 10 can be configured to allow for inspection of termination end 12 of a cable 14 (and socket seating thereof) to determine and analyze the current condition of termination end 12, cable 14 and/or socket portion 13. For example, cover assembly 10 can allow for inspection to determine whether or not sub-ropes or cable strands have broken, judge excessive seating, and/or determine whether or not the potting compound or resin within socket 13 has begun to degrade or fail. Importantly, cover assembly 10 can be configured to allow for inspection of termination end 12 without removal of cover assembly 10 components and without the use of significant tooling.

Figure 1:
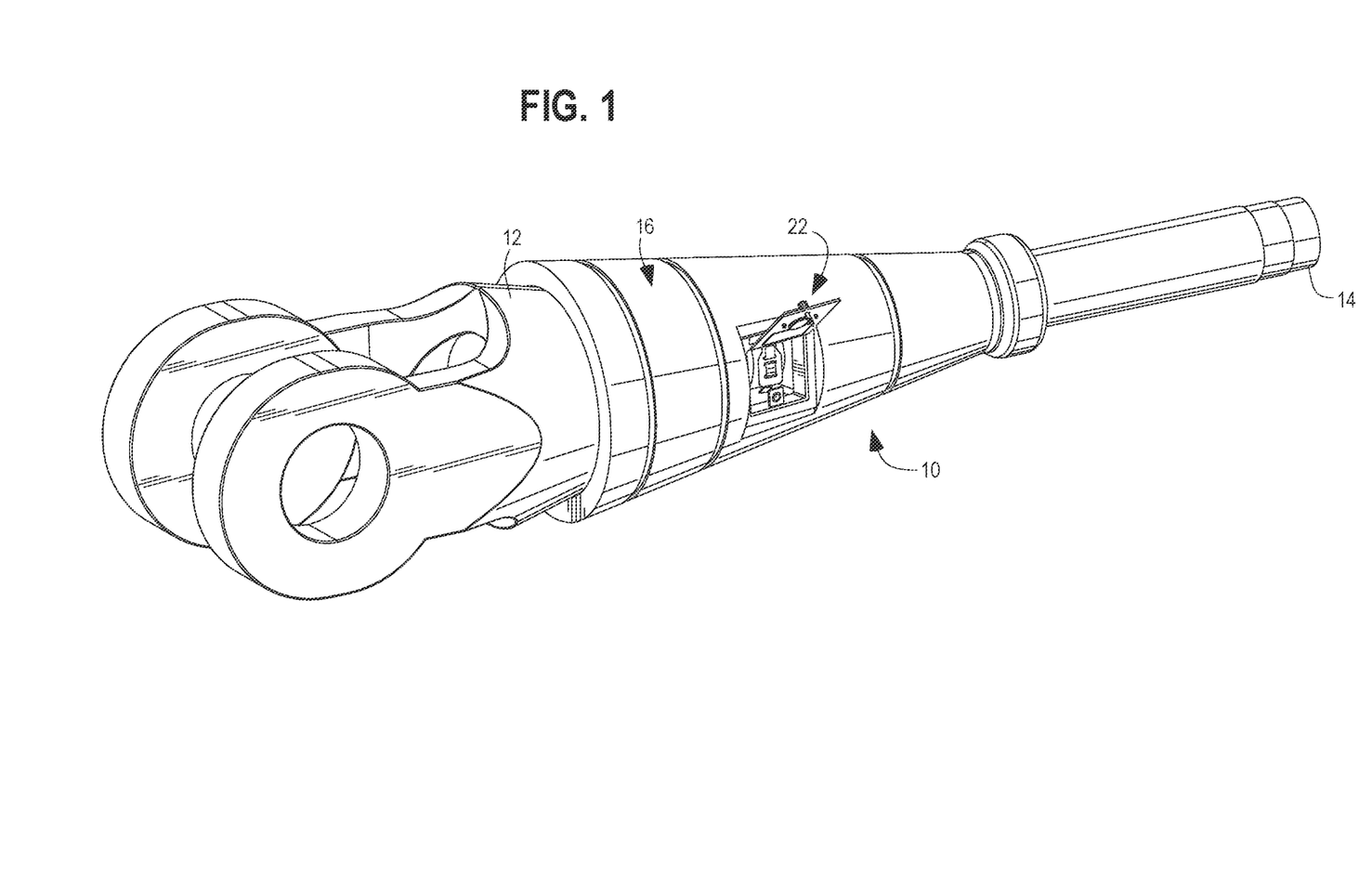
FIG. 1 is a perspective view of a cover assembly for a cable termination end in accordance with one embodiment of the present invention.
Figure 2:
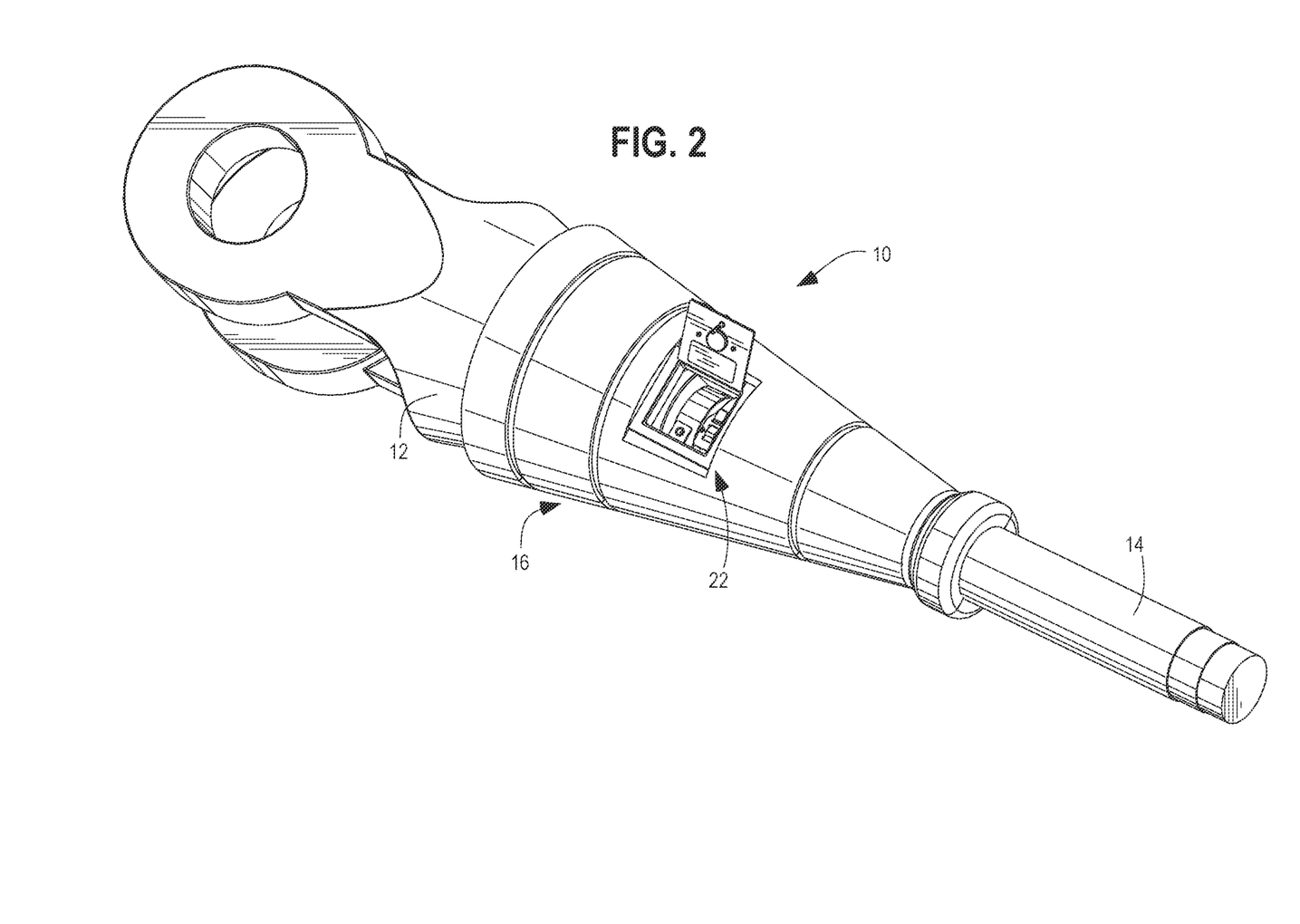
FIG. 2 is a side perspective view of the cover assembly of FIG. 1, illustrating an inspection port component in an opened position.
Figure 3:
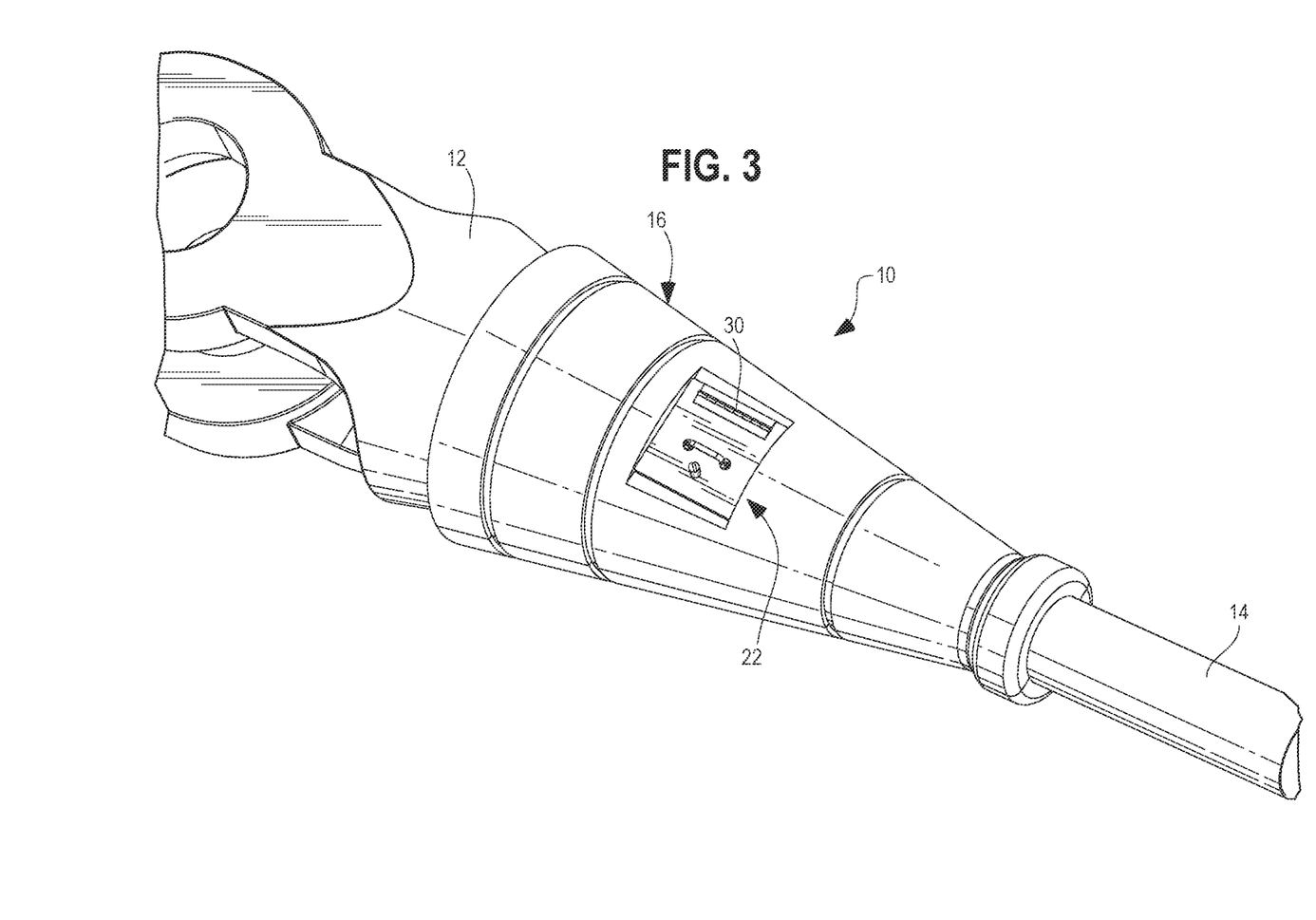
FIG. 3 is a side perspective view of the cover assembly of FIG. 1, illustrating an inspection port component in a closed position.

FIGS. 1-7 illustrate cover assembly 10 according to one embodiment of the present invention and configured for placement on the neck of the socket 13 for termination end 12 of a cable 14. As best shown in FIGS. 1-3, cover assembly 10 can include a shell 16 positioned onto the socket 13 of termination end 12 and extending partially onto termination end 12 and cable 14 in each direction.

Figure 4:
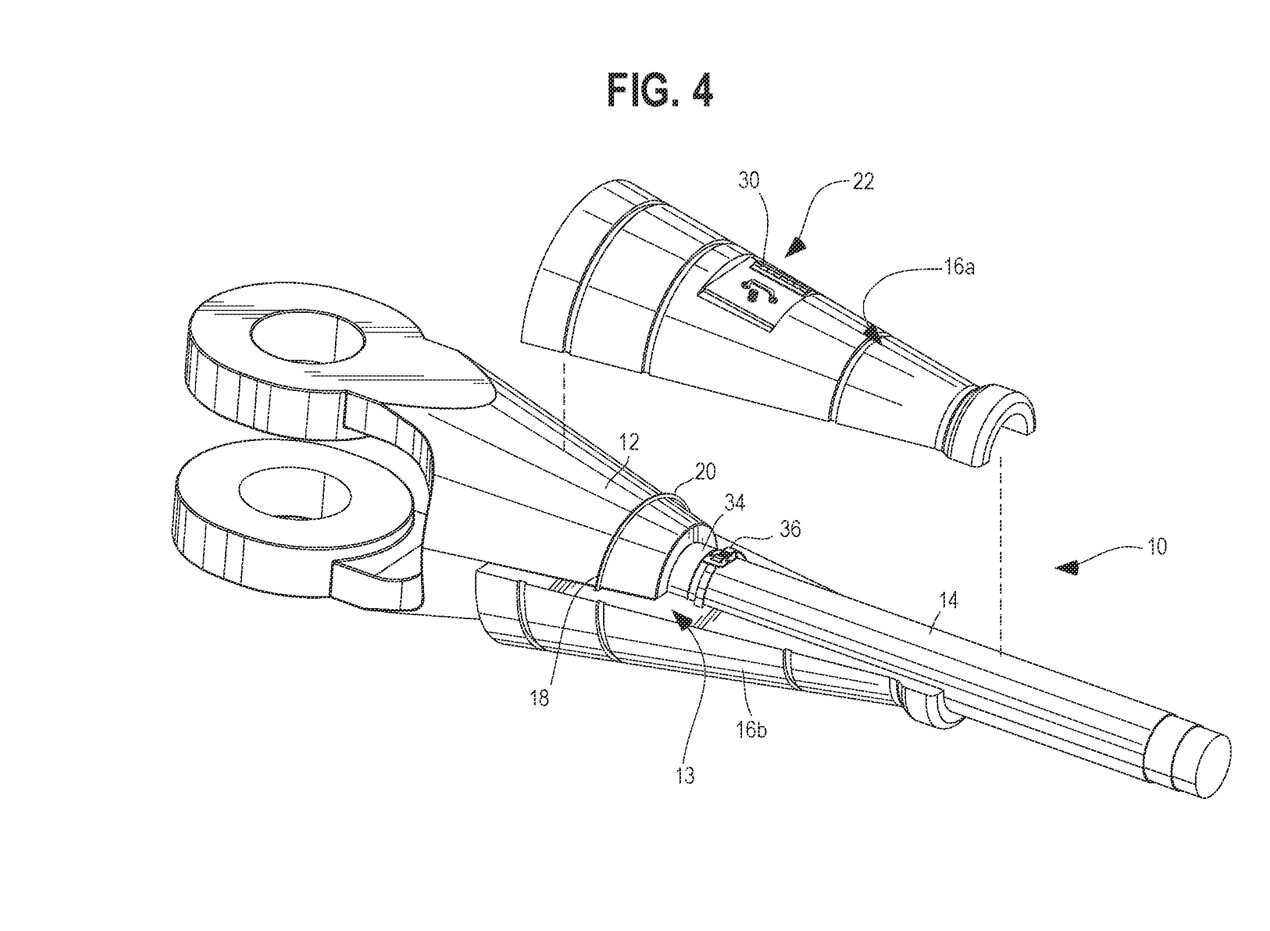
FIG. 4 is an exploded side perspective view of the cover assembly of FIG. 1.

As best shown in FIG. 4, the cable 14 extends into one end of termination end 12 and is secured therein by a potting compound, resin, or other suitable material to form the socket assembly 13. The terminal end of the cable 14 extends into and is positioned within the termination end 12 and socket 13 thereof, and the cable can include a visible end adjacent the socket 13 and extending outward therefrom. As best shown in FIG. 4, the entirety of cable 14, including the cable core and the jacket on cable 14 can extend into termination end 12, such that no exposed fibers of the core of cable 14 are visible. Stated another way, the core of cable 14 can be completely enclosed by the cable jacket as it extends into termination end 12.

Figure 5:
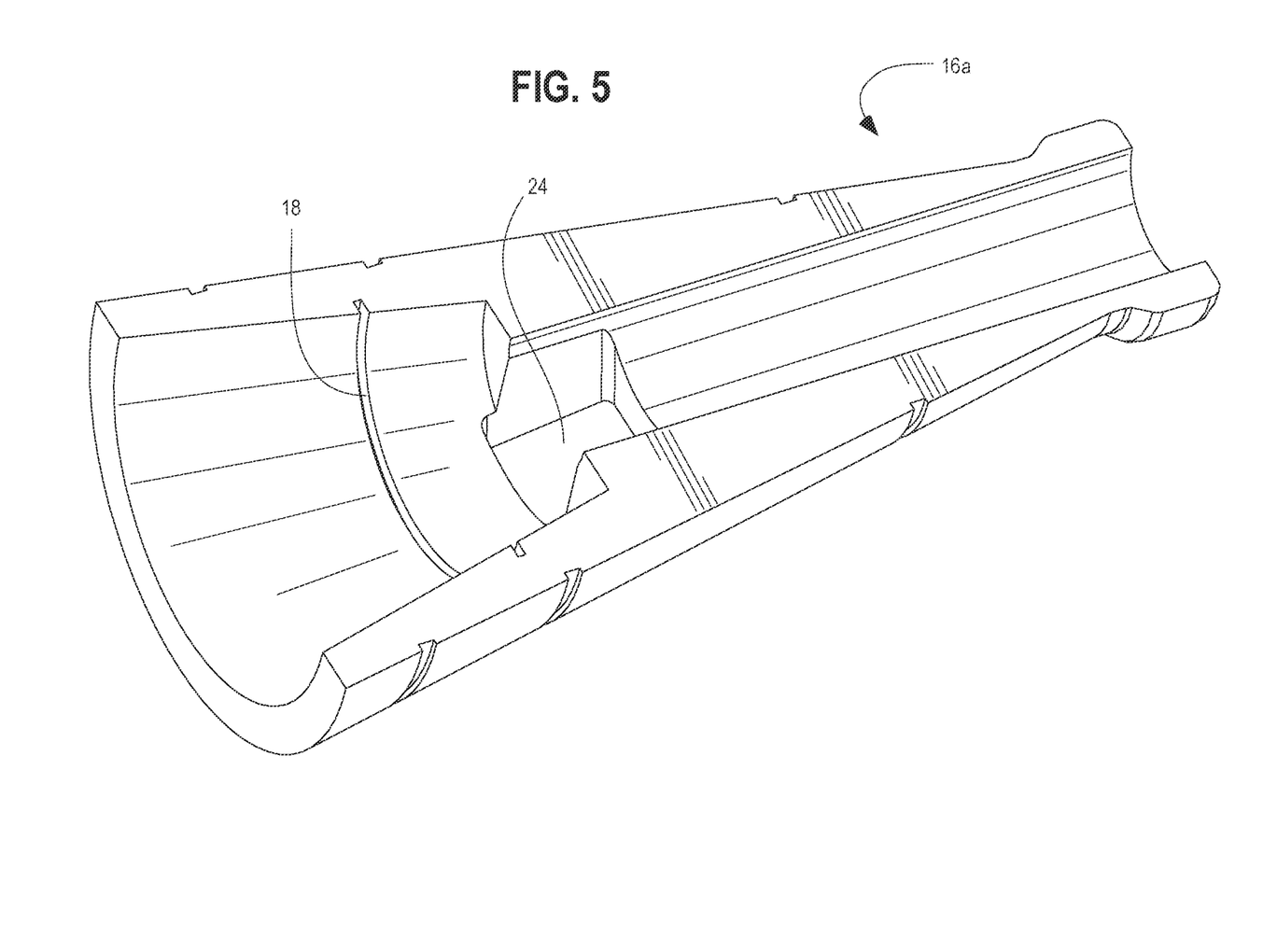
FIG. 5 is a perspective view of a shell of the cover assembly of FIG. 1 in accordance with one embodiment of the present invention.

As further shown in FIGS. 4 and 5, shell 16 can formed by two shell halves 16A and 16B that are secured, connected, or clamped together to fully surround and encapsulate the socket of termination end 12. Shell halves 16A and 16B can be secured together using any suitable means, including welding, clamping, sealants, heat melting, and adhesives. Shell 16 can be formed from urethane or any other suitable material. It is also recognized that shell 16 may be formed as a single formed structure formed onto cable 14 or as two or more pieces or structures positioned onto cable 14 and secured or connected together. As best shown in FIG. 4, shell 16 may further include one or more annular grooves 18 for receiving an annular ring 20 on termination end 12 of cable 14 to assist in properly seating cover assembly 10 onto the end of cable 14 and socket 13 and restrict movement of cover assembly 10 thereon.

Figure 6:
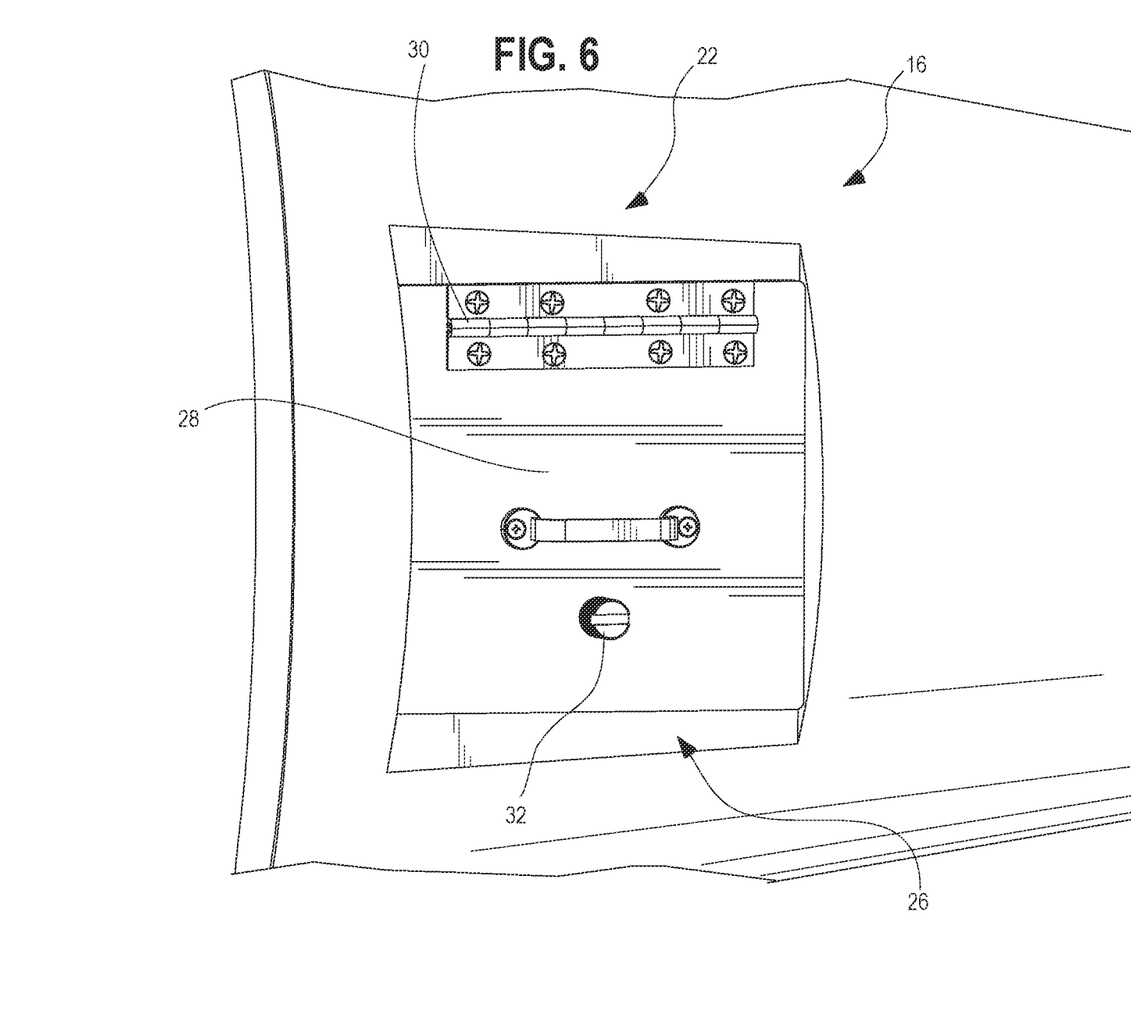
FIG. 6 is a partial perspective view of the cover assembly of FIG. 1, illustrating the inspection port component in a closed position.
Figure 7:
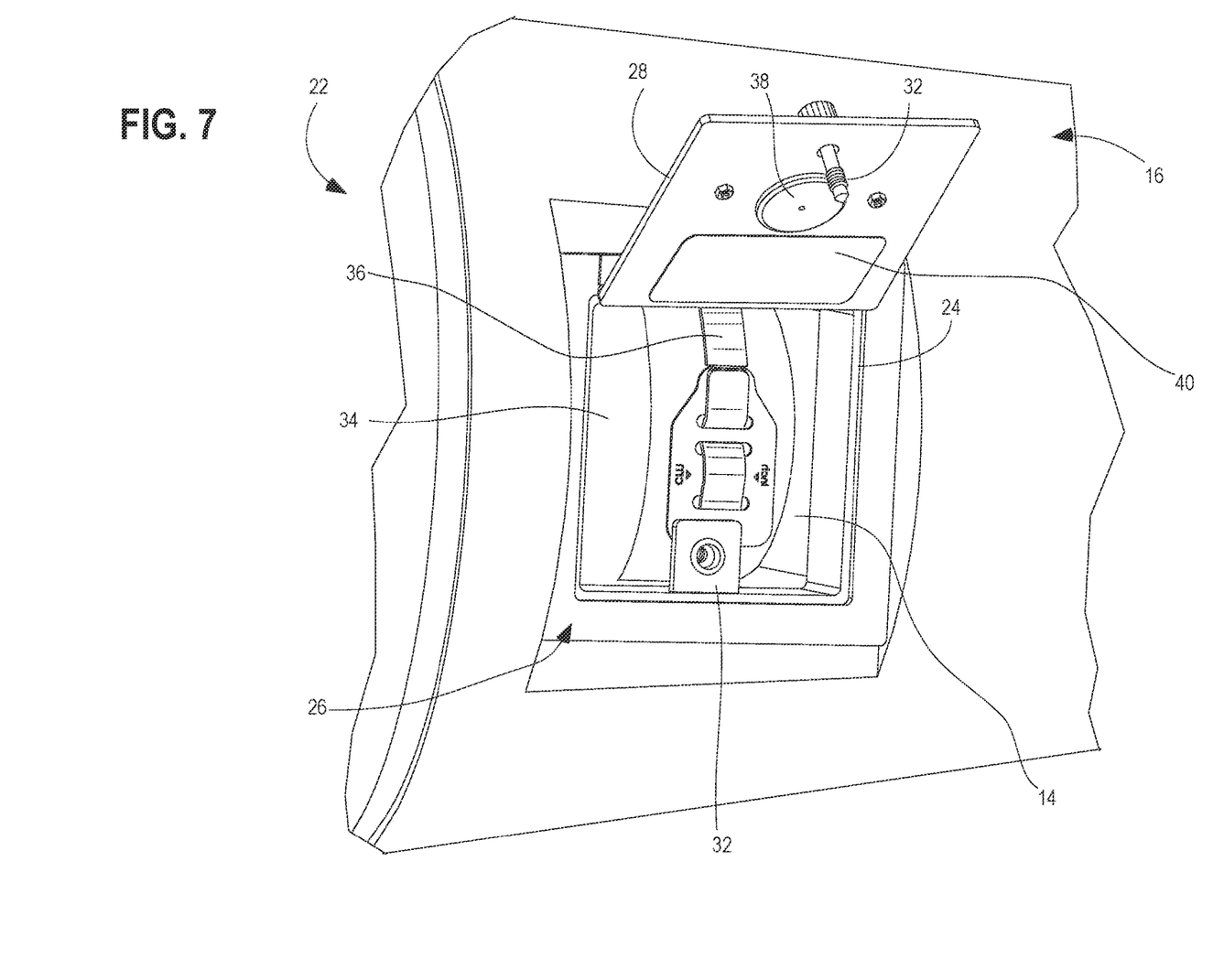
FIG. 7 is a partial perspective view of the cover assembly of FIG. 1, illustrating the inspection port component in an opened position.
Figure 8:
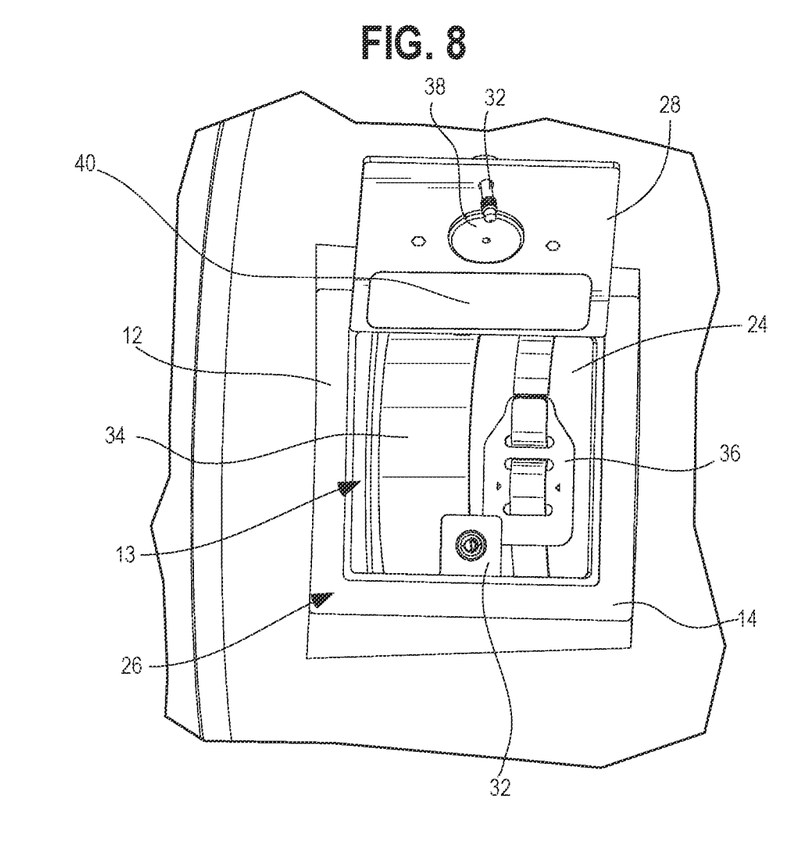
FIG. 8 is a partial perspective view of a cover assembly with inspection port component in accordance with another embodiment of the present invention.

As illustrated in FIGS. 1-5 and shown in greater detail in FIGS. 6-8, cover assembly 10 can include an inspection port component or hatch component 22 that enables viewing access to the socket 13 of cable 14 and termination end 12. Inspection port 22 can include an opening or window 24 defined through shell 16 so that the socket seating of cable 14 and termination end 12 is visible for inspection through window 24. As best shown in FIGS. 4, 7 and 8, inspection port 22 (via window 24) can make accessible a visible region that includes the visible jacketed end of cable 14 where the terminal end of cable 14 extends into termination end 12, which forms the socket 13 of cable 14 and terminal end 12. As also shown in FIG. 7 and described in greater detail below, the visible region may also provide visible access to one or more measuring devices and inspection tools provided on the visible jacketed end of cable 14 immediately adjacent socket 13.

As best shown in FIGS. 6 and 7, inspection port 22 can include a port frame 26 defining opening 24 and a port door or cover plate 28 attached to port frame 26 by a hinge or similar connection 30. As shown, cover plate 28 may be rotatably connected by hinge 30 so that cover plate 28 may transition between closed (FIG. 6) and opened (FIG. 7) configurations. Hinge 30 can be secured to port frame 26 and/or cover plate 28 using any suitable means, including screws, welding, sealants, heat melting, and adhesives. In alternative embodiments (not shown), cover plate 28 need not be necessarily connected by a rotatable hinge and instead can be configured to be selectively removable from frame 26 or otherwise removably connected to frame 26 using any suitable means or methods so that cover plate 28 can be moved away from opening 24 for inspection of cable 14. Inspection port 22 can additionally include a thumb screw or other opening means 32 for selectively releasing cover plate 28 from port frame 26 to the open position as well as securing cover plate 28 to frame 26 in the closed position. As best shown in FIG. 8, according to one embodiment, opening means 32 can include a thumb screw provided on cover plate 28 and a nut or washer provided on frame 26 for receiving and selectively retaining the thumb screw. Opening means 32 may alternatively be configured as a latch, lock, detent, or the like.

As best shown in FIGS. 4, 7, and 8, cover assembly 10 can include a seating tracking band 34 provided around cable 14 and located at the nose or inlet of the socket 13 for termination end 12 to allow for visual tracking of the socket seating of termination end 12. Seating tracking band 34 can be wrapped around the jacket of cable 14 and secured to the nose/inlet of socket 13 after production of the cable 14 and prior to shell 16 being applied to cable 14. As also shown, inspection port 22 can be positioned along the length of shell 16 of cover assembly 10 so that seating tracking band 34 may be visible through opening 24 when cover plate 28 is opened, as best shown in FIGS. 7 and 8. Inspection port 22 can allow a user to view and measure the position of seating tracking band 34 through port window or opening 24 and assess where the initial socket seating of cable 14 was. If seating tracking band 34 has significantly slid down within port window 24, it may be a sign of termination degradation.

Figure 9:
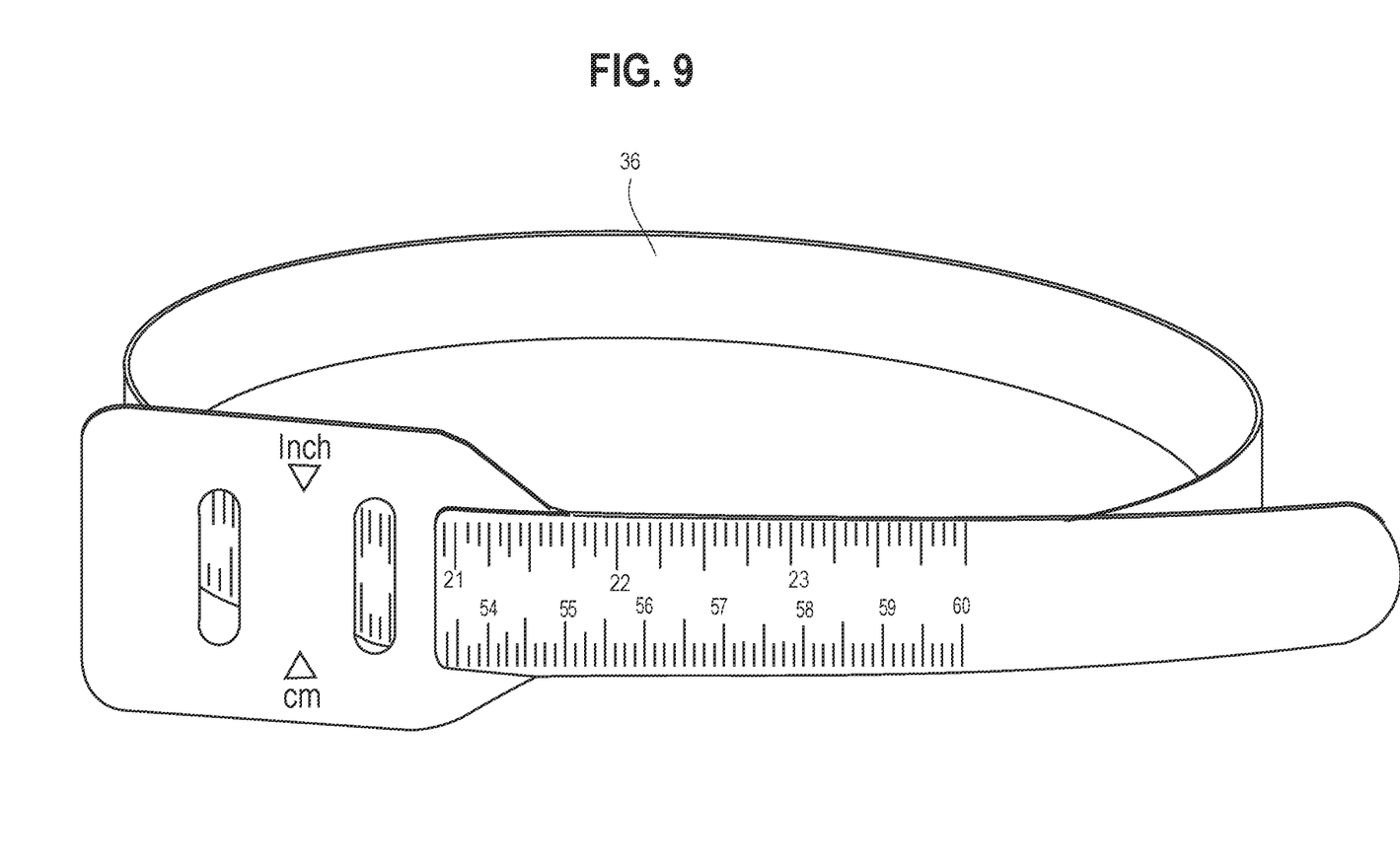
FIG. 9 is a perspective view of a diameter measuring device used in the cover assembly of FIG. 1 in accordance with one embodiment of the present invention.

As further shown in FIGS. 4, 7, and 8, cover assembly 10 can include a diameter measuring device 36 that is wrapped around cable 14. Similar to seating tracking band 34, diameter measuring device 36 can be positioned onto cable 14 at a visible end portion of cable 14 adjacent to socket 13 so that it is visible through opening 24 of inspection port 22 when cover plate 28 is opened. Diameter measuring device 36 can be configured as any suitable type of circumferential measuring tape or similar component that allows a user to visually inspect and determine the diameter of cable 14. Among other functions, diameter measuring device 36 can be used to allow a user to determine whether sub-ropes, fibers, or strands within cable 14 have broken and allow the user to assess potential damage therefrom. FIG. 9 illustrates diameter measuring device 36 according to one embodiment of the invention where device 36 is configured as a circumferential measuring tape with an end tab for tightening the tap around cable 14 to determine the cable diameter. An inspector can utilize diameter measuring device 36 by opening cover plate 28, using the end tab of device 36 to tighten device 36 around the diameter of cable 14, and then reading the measurement provided thereon. It is also recognized that any suitable design or configuration for device 36 can be used.

Both seating tracking band 34 and diameter measuring device 36 can be independent of cover assembly 10 and shell 16 in certain embodiments of the invention. Band 34 and device 36 can be applied directly to cable 14 after formation and seating of termination end 12. Once shell 16 is then secured onto cable 14 at the socket end 13, both band 34 and device 36 can then be accessible for visual inspection through inspection port 22. This configuration can eliminate the need to remove shell 16 to determine movement of the socket and diameter of cable 14 and assess potential damage therefrom.

As further shown in FIGS. 7 and 8, cover assembly 10 can also include a Near-Field Communication (NFC) chip 38 that can allow for wireless communication with a mobile device or similar electronic device as described in greater detail below in connection with system 100. It is also recognized that NFC chip 38 may be alternatively configured as any type of RFID chip or other electronic circuit or microchip that stores information and allows for wireless communication with other electronic devices. As shown in FIGS. 7 and 8, NFC chip 38 can be attached or positioned on the interior side of cover plate 28 or any alternative suitable location on cover assembly 10. NFC chip 38 can be configured to identify the details and specifications for the particular cable 14 and termination end 12 to which cover assembly 10 is provided on for access by a user through an equipped mobile device or other electronic device. Additionally, a plate or label 40 with the same manufacturing data may be provided at the interior of cover plate 28 as best shown in FIGS. 7 and 8. NFC chip 38 can store a serial code for the specific cable 14 and termination end 12 to which cover assembly 10 is attached and/or can contain instructions that automatically directs the user to a website, application, or server and user interface that displays the details and specifications of the cable 14 and termination end 12 on the user's mobile or electronic device. NFC chip 38 can additionally or alternatively store details and specifications for the cable 14 and termination end 12 directly on the chip 38 in particular embodiments of cover assembly 10. An inspector or user may use NFC chip 38 by tapping a mobile device having wireless and/or Bluetooth technologies against NFC chip 38, which can then link the mobile device to a data interface form with information on the specific cable 14 and termination end 12 and/or display cable 14 and termination end 12 information from NFC chip 38 directly on the user's mobile device. It is also recognized that NFC chip 38 can be configured for any other alternative commonly known methods for linking the mobile device to NFC chip 38.

The use and application of cover assembly 10 will now be described in additional detail. As described above, cover assembly 10 can be secured around the socket seating of a termination end 12 for a synthetic cable 14, such as a boom pendant or other potted termination cable application. Prior to securing cover assembly 10, seating tracking band 34 and diameter measuring device 36 can be installed onto cable 14.

Once cover assembly 10 is applied to a cable 14, and cable 14 is placed in use in the field, cover assembly 10 can then allow for easy inspection of the socket seating of cable 14 in the field to determine the condition of the socket and/or whether termination end 12 and cable 14 needs to be removed from service due to potential failure or degradation. A user can use inspection port 22 on cover assembly 10 to open cover plate 28 and gain access to a visible region of cable 14 to visually inspect socket portion 13 of cable 14 and termination end 12 through opening 24. The visible region (which is framed by opening 24 of inspection port 22) provides visibility for viewing and inspecting socket 13 of termination end 12 and cable 14 along with the adjacent visible jacketed end of cable 14 extending away from socket 13 as best shown in FIG. 8. The user may inspect seating tracking band 34 at the nose or inlet of the socket 13 to determine slipping or movement at the socket seating. The user may use diameter measuring device 36 to measure the diameter of cable 14 and identify any change in diameter that may be the result of broken sub-ropes or other issues. The user may also use a mobile or electronic device for wireless communication with NFC chip 38 located on cover assembly 10 to obtain data and specifications for cable 14 to aid in the inspection. For example, NFC chip 38 can store the serial code for the specific socket end of termination end 12 and cable 14 combination that cover assembly 10 is provided on, and when accessed, NFC chip 38 can link a user's mobile device to a data interface form or a data set that can display manufacturing data and information for cable 14 and/or termination end 12. According to one embodiment, NFC chip 38 can also optionally be configured to allow the data and information to be emailed or transmitted to others locations or devices. NFC chip 38 can be accessed by tapping a mobile device against chip 38. Once the inspection is completed, the user can close cover plate 28 on cover assembly 10 and secure it in place.

Cover assembly 10 can enable inspection of cable 14 and termination end 12 thereof, and particularly socket portion 13 forming the connection of the end of cable 14 with termination end 12. Specifically, cover assembly 10 (via inspection port 22) can allow this region of cable 14 to be fully inspected without needing to remove all or part of cover assembly 10, without needing to access to the interior of termination end 12, socket 13, and without needing to access or view the interior of cable 14. Inspection port 22 allows a user to visibly inspect socket 13 to determine the condition of the socket 13 and cable 14 while measuring devices 34 and 36 allow the user to assess the seating of socket 13 and determine the condition of cable 14 and assess whether the interior sub-ropes, strands or fibers of cable 14 are damaged without the necessity of providing access to the interior components of termination end 12 or cable 14.

Figure 10:
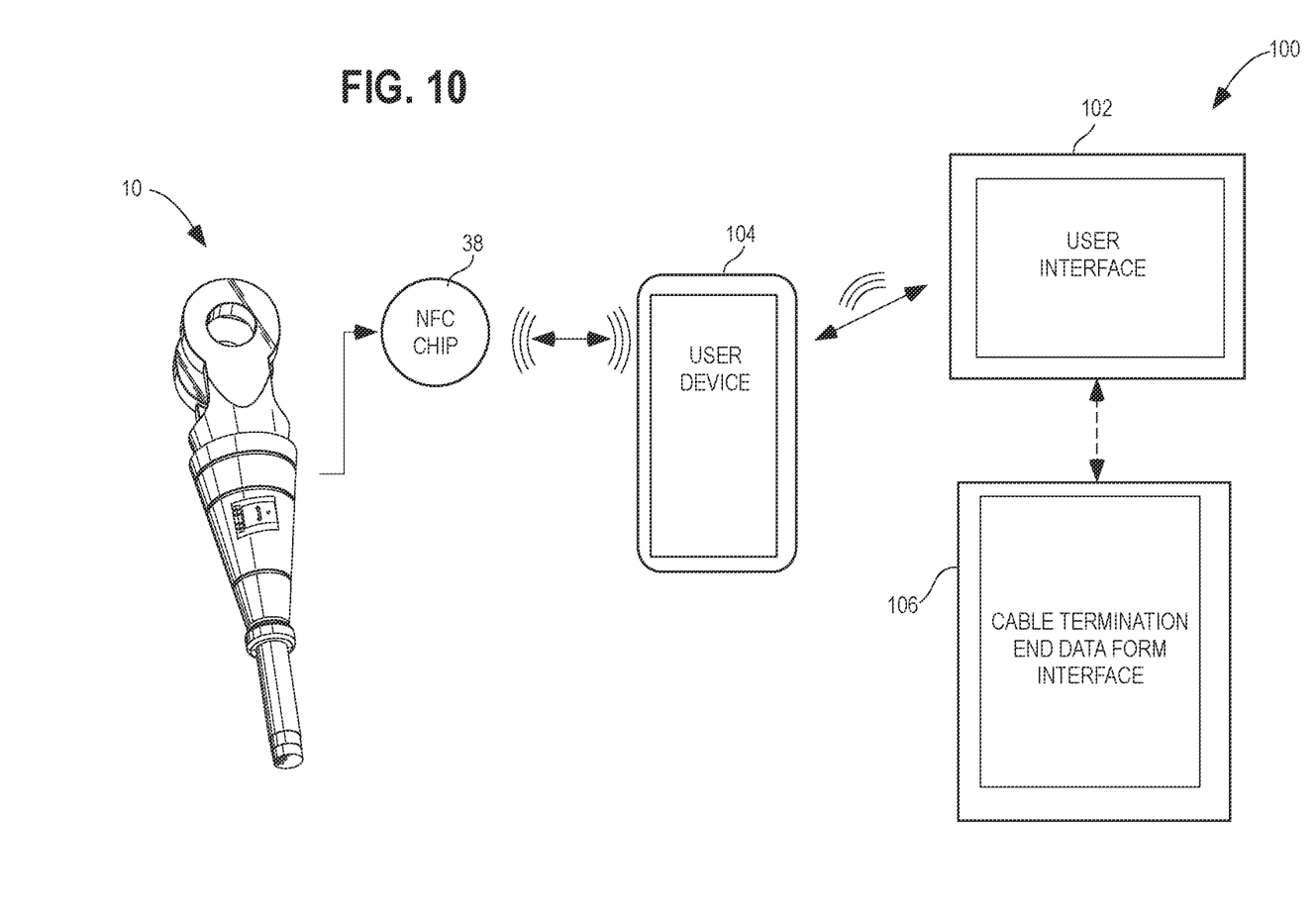
FIG. 10 is a schematic view of a system for operating a cover assembly to inspect a cable termination end in accordance with one embodiment of the present invention.

FIG. 10 schematically illustrates cover assembly system 100 in accordance with one embodiment of the present invention. As shown, system 100 can include a cover assembly 10 having NFC chip 38, with cover assembly 10 provided on a synthetic cable such as a boom pendant. System 100 can also include multiple cover assemblies 10 on different cables in different locations depending on the particular application. As further illustrated, system 100 includes a user interface 102 that can display cable termination properties, and/or optionally can be remotely accessible through a server or other suitable means. When a user inspects the particular cable end and socket seating on which cover assembly 10 is provided, NFC chip 38 on cover assembly 10 enables the user to wirelessly access the user interface 102 via a mobile device or other electronic device 104 as schematically shown in FIG. 10. NFC chip 38 on cover assembly 10 contains information to direct the user's mobile device 104 to a specific cable end data interface 106 that is specific to the data set relevant to that specific cable and termination end for cover assembly 10. This data interface 106 contains information, details, and data for the cable and termination end for viewing by the user. According to one embodiment, data interface 106 may also be configured to optionally allow the user to input measurements, notes and information from the inspection.

From the foregoing, it will be seen that this invention is one well adapted to attain all the ends and objects hereinabove set forth together with other advantages which are obvious, and which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations, and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention.

What is claimed is:

1. A cover assembly for a synthetic cable having a termination end secured on a jacketed end of the synthetic cable, the cover assembly comprising:
   a shell configured to extend around and at least partially enclose a socket portion of the termination end of the synthetic cable; and
   an inspection port defined into the shell for viewing access of at least part of the termination end of the synthetic cable;
   wherein the inspection port is positioned along a length of the shell that aligns with the socket portion of the termination end so that the socket portion of the termination end and the jacketed end of the synthetic cable are visible through the inspection port, and wherein the jacketed end of the synthetic cable extends into the socket portion of the termination end.

2. The cover assembly of claim 1, further comprising a Near-Field Communication (NFC) chip configured for the termination end of the synthetic cable.

3. The cover assembly of claim 1, further comprising a seating tracking band wrapped around the jacketed end of the synthetic cable and located at a nose end of the socket portion of the termination end, wherein the seating tracking band is visible through the inspection port.

4. The cover assembly of claim 1, further comprising a diameter measuring device wrapped around the jacketed end of the synthetic cable and configured for enabling a measurement of a diameter of the jacketed end of the synthetic cable adjacent the termination end, wherein the diameter measuring device is visible through the inspection port.

5. The cover assembly of claim 1, wherein the inspection port comprises an opening having a perimeter defined entirely through the shell, a cover attached to the perimeter of the opening, wherein the cover is configured to selectively enclose the opening.

6. The cover assembly of claim 5, wherein the cover is rotatably attached to the perimeter of the opening by a hinge.

7. The cover assembly of claim 5, wherein the inspection port includes a locking means for selectively opening the cover to an opened configuration and selectively securing the cover over the opening in a closed configuration.

8. The cover assembly of claim 1, wherein the shell comprises an annular groove formed circumferentially in the interior of the shell and generally aligned with and conforming to an annular ring formed onto the termination end of the synthetic cable.

9. A synthetic cable assembly comprising:
a synthetic cable comprising one or more cable sub-ropes forming a core and a jacket surrounding the core, wherein the synthetic cable includes a cable end and a visible portion adjacent the cable end;
a termination end comprising a socket portion, wherein the cable end of the synthetic cable is secured within the socket portion, wherein the jacket of the synthetic cable extends into the socket portion of the termination end;
a shell configured to extend around and at least partially enclose the socket portion of the synthetic cable; and
an inspection port defined into the shell for viewing access of at least a portion of the synthetic cable and at least a portion of the termination end, wherein the inspection port is positioned on the shell at the socket portion of the termination end and the visible portion of the synthetic cable.

10. The synthetic cable assembly of claim 9, wherein the inspection port comprises an opening having a perimeter defined entirely through the shell and a cover attached to the perimeter of the opening.

11. The synthetic cable assembly of claim 10, wherein the cover is configured to selectively enclose the opening.

12. The synthetic cable assembly of claim 10, further comprising a microchip, wherein the microchip is secured to the shell or the inspection port.

13. The synthetic cable assembly of claim 12, wherein the microchip is configured for wireless communication with an electronic mobile device.

14. The synthetic cable assembly of claim 12, wherein the microchip stores at least one data component specific to at least one of the termination end, the synthetic cable, or the synthetic cable assembly.

15. The synthetic cable assembly of claim 9, further comprising a seating tracking band wrapped around the visible portion of the synthetic cable and located at a nose end of the socket portion, wherein the seating tracking band is visible through the inspection port.

16. The synthetic cable assembly of claim 9, further comprising a diameter measuring device wrapped around the synthetic cable and configured for enabling a measurement of a diameter of the synthetic cable, wherein the diameter measuring device is visible through the inspection port.

* * * * *